United States Patent [19]

Taylor

[11] Patent Number: 4,542,278
[45] Date of Patent: Sep. 17, 1985

[54] LASER MATERIAL PROCESSOR

[75] Inventor: Arthur F. D. S. Taylor, Abingdon, England

[73] Assignee: Flexible Laser Systems Limited, Cheshire, England

[21] Appl. No.: 558,356

[22] Filed: Dec. 5, 1983

[30] Foreign Application Priority Data

Dec. 6, 1982 [GB] United Kingdom ................. 8234681

[51] Int. Cl.⁴ .............................................. B23K 26/02
[52] U.S. Cl. ................................ 219/121 LV; 901/42
[58] Field of Search ................ 219/121 LU, 121 LV, 219/121 L, 121 LM; 901/42, 47, 4

[56] References Cited

FOREIGN PATENT DOCUMENTS 2120202 11/1983 United Kingdom .
2134071 8/1984 United Kingdom ........ 219/121 LG Primary Examiner—C. L. Albritton
Attorney, Agent, or Firm—Kerkam, Stowell, Kondracki & Clarke

[57] ABSTRACT

An apparatus for carrying out materials processing operations, comprises an industrial robot assembly including an arm one end of which is pivotally connected to a pedestal assembly, and a second end of which has a pivotally-mounted working head including a laser beam focusing assembly the axes about which the arm of the industrial robot and the working head rotate being parallel to each other, a laser beam guide assembly mounted on the arm of the industrial robot having a first optical elbow assembly mounted so that an optical axis is coincident with the axis of rotation of the first end of the arm of the industrial robot and arranged to direct an incoming beam of laser radiation from a fixed laser source in a direction parallel to the longitudinal axis of the arm of the industrial robot to a second optical elbow assembly mounted with the optical axis coincident with that about which the working head pivots and arranged to direct the laser beam to a third optical elbow assembly which forms part of the working head and has an optical axis co-planar with that of the second optical elbow assembly but orthogonal to it and arranged to direct the laser beam to the laser beam focusing assembly, the said optical elbow assemblies being adapted to permit rotational motion about the said optical axes without affecting the alignment of the laser beam.

8 Claims, 1 Drawing Figure

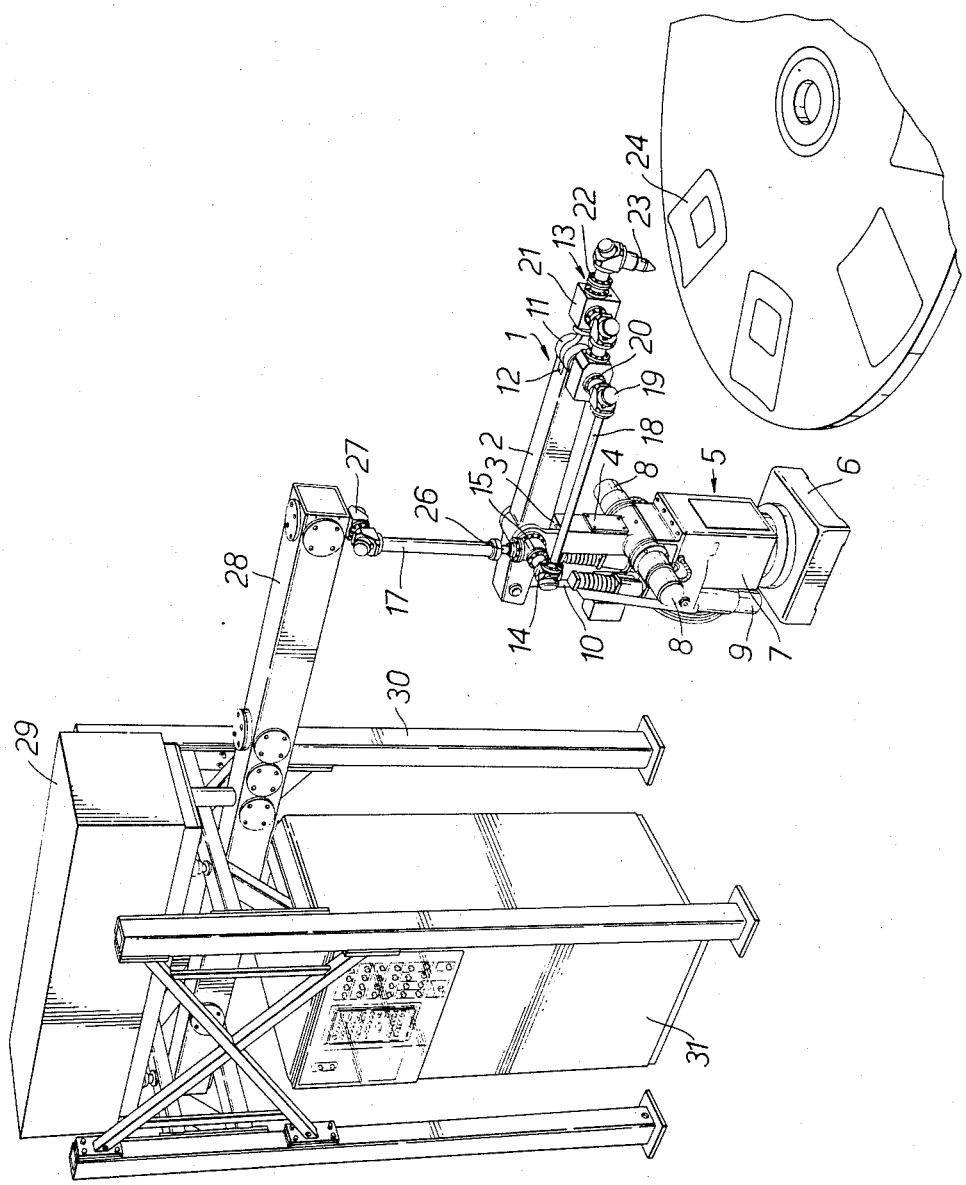

LASER MATERIAL PROCESSOR

The present invention relates to the processing of materials by means of lasers and in particular to numerically controlled laser cutting and welding operations.

Laser apparatus is now used for cutting and/or welding operations to fabricate many types of artefacts on a repetitive basis. To do this effectively, the laser beam has to be constrained to follow a pre-set path on any given workpiece. This can be done either by moving the workpiece relative to a fixed laser beam focusing head, or vice versa. For anything other than flat workpieces, however, the latter approach poses great problems if the power required is too large to be provided by a laser that readily can be mounted on an arm and moved over the required path.

According to the present invention there is provided an apparatus for carrying out materials processing operations, comprising an industrial robot assembly including an arm one end of which is pivotally connected to a pedestal assembly, and a second end of which has a pivotally-mounted working head including a laser beam focusing assembly the axes about which the arm of the industrial robot and the working head rotate being parallel to each other, a laser beam guide assembly mounted on the arm of the industrial robot having a first optical elbow assembly mounted so that an optical axis is coincident with the axis of rotation of the first end of the arm of the industrial robot and arranged to direct an incoming beam of laser radiation from a fixed laser source in a direction parallel to the longitudinal axis of the arm of the industrial robot to a second optical elbow assembly mounted with an optical axis coincident with that about which the working head pivots and arranged to direct the laser beam to a third optical elbow assembly which forms part of the working head and has an optical axis co-planar with that of the second optical elbow assembly but orthogonal to it and arranged to direct the laser beam to the laser beam focusing assembly, the said optical elbow assemblies being adapted to permit rotational motion about the said optical axes without affecting the alignment of the laser beam.

Preferably there is included also a further beam guide tube linking the first optical elbow assembly to the fixed laser source, the further beam guide tube including a telescopic joint and an optical elbow assembly which again is capable of permitting rotational movement about an optical axis of the optical elbow assembly without affecting the alignment of the laser.

The invention will now be described by way of example, with reference to the accompanying drawing which is a general view of a laser apparatus embodying the invention.

Referring to the drawing, a laser materials processing apparatus comprises, an industrial robot assembly, indicated generally by the reference numeral 1, includes an arm 2, which is mounted in a fork 3 at one end of a pillar 4 which forms part of a pedestal unit 5 which is mounted on a base 6.

The pillar 4 is pivotally mounted on a main portion 7 of the pedestal unit 5 and can be moved in a vertical plane by means of a drive unit 8. The complete pedestal unit 5 is able to rotate about a vertical axis under the action of an electric motor 9. The arm 2 of the robot assembly 1 is caused to pivot in the fork by means of a ram 10. The free end 11 of the arm 2 of the robot assembly 1 terminates in a fork 12 in which there is pivoted a working head assembly, indicated generally by the numeral 13. The working head assembly 13 is caused to move in a vertical plane by a motor unit, which is not shown in the figure. A first optical elbow assembly 14 which includes two mirrors, each positioned to deflect an incident laser beam through a right angle, is mounted on one side of the fork 3 so that the optic axis formed by the line joining the centres of the mirrors is coincident with the axis of movement of the arm 2 of the robot 1. The optical elbow assembly 14 includes a rotary joint 15 which enables the orientation of the mirrors relative to each other to be varied to accommodate movements of the arm 2 and the pillar 4 of the robot assembly 1 so that as the orientation of the arm 2 of the robot assembly 1 relative to an input laser beam guide assembly 17 changes, the laser beam emerging from the optical elbow assembly 14 continus to pass axially down a laser beam guide tube 18 which links the optical elbow assembly 14 to another optical elbow assembly 19. The optical elbow assembly 19 includes two mirrors, each arranged to deflect an incident laser beam through a right angle, mounted so that the optical axis formed by the line joining the centres of the two mirrors is coincident with the axis of rotation of the working head assembly 13 in the fork 12 at the free end 11 of the arm 2 of the robot assembly 1. The optical elbow assembly 19 includes a rotary joint 20, which enables the orientation of its two mirrors to vary to accommodate movements of the working head 13. The laser beam leaving the second optical elbow assembly 19 is directed to a third optical elbow assembly 21 which forms part of the working head 13. The optical elbow assembly 21 includes three mirrors, two of which are fixed in relation to each other, and one of which can be moved relative to one of the fixed mirrors by means of a joint 22, in the same way as for the first and second optical elbow assemblies 14 and 19. The optical axis of the movable mirrors of the optical elbow assembly 21 is orthogonal to those of the optical elbow assemblies 14 and 19. The third optical elbow assembly 21 directs the laser beam to a focusing head 23 which is arranged to bring the laser beam to a focus upon a workpiece shown generally by the reference numeral 24.

The laser beam guide assembly 17 includes a telescopic and rotatable joint 26 and an optical elbow assembly 27, similar to those already described, which links the laser beam guide assembly 17 to a fixed optical bench 28. The optical bench 28 is connected to a laser source 29 which is mounted on a gantry 30.

The combination of the optical elbow assemblies 13, 19, 21 and 27 together with the telescopic and rotatable joint 26 in the laser beam guide assembly 17 enables the laser beam focusing head 23 to accommodate all the motions of which the robot assembly 1 is capable under the action of a control cabinet 31.

What we claim is:

1. Apparatus for carrying out materials processing operations, comprising an industrial robot assembly including an arm one end of which is pivotally connected to a pedestal assembly, and a second end of which has a pivotally-mounted working head including a laser beam focusing assembly the axes about which the arm of the industrial robot and the working head rotate being parallel to each other, a laser beam guide assembly mounted on the arm of the industrial robot having a first optical elbow assembly mounted so that an optical axis is coincident with the axis of rotation of the first end of the arm of the industrial robot and arranged to direct an incoming beam of laser radiation from a fixed laser source in a direction parallel to the longitudinal axis of the arm of the industrial robot to a second optical elbow assembly mounted with an optical axis coincident with that about which the working head pivots and arranged to direct the laser beam to a third optical elbow assembly which forms part of the working head and has an optical axis co-planar with that of the second optical elbow assembly but orthogonal to it and arranged to direct the laser beam to the laser beam focusing assembly, the said optical elbow assemblies being adapted to permit rotational motion about the said optical axes without affecting the alignment of the laser beam.

2. Apparatus as claimed in claim 1 which includes a further laser beam guide linking the first optical elbow assembly to the fixed laser apparatus and a fourth optical elbow assembly connecting the further beam guide to the fixed laser apparatus and capable of permitting rotational movement of the further beam guide about an optical axis of the fourth optical elbow assembly without affecting the alignment of the laser beam.

3. Apparatus as claimed in claim 2 in which the pedestal assembly of the robot assembly is movable about an axis parallel to the pivotal axis of the arm, the further laser beam guide including a telescopic joint to accommodate such movement of the pedestal assembly.

4. Apparatus as claimed in claim 1 in which each optical elbow assembly includes at least two reflecting surfaces each arranged to deflect an incident beam of laser radiation through a right angle, the line joining the centres of two reflecting surfaces in an assembly passing through to an axis of rotation of the arm of the robot assembly.

5. Apparatus as claimed in claim 4 in which the reflecting surfaces are mirrors.

6. Apparatus as claimed in claim 1 in which the fixed laser apparatus includes a laser source and a fixed optical bench.

7. Apparatus as claimed in claim 1 which includes control means operable to control the movement of the arm of the robot assembly.

8. Apparatus as claimed in claim 1 in which each optical elbow assembly includes at least two reflecting surfaces each arranged to deflect an incident beam of laser radiation through a right angle, the line joining the centres of two reflecting surfaces in an assembly being parallel to an axis of rotation of the arm of the robot assembly.

* * * * *